US012676271B2

(12) United States Patent
Santhanam

(10) Patent No.: US 12,676,271 B2
(45) Date of Patent: Jul. 7, 2026

(54) APPARATUSES AND METHODS FOR IMPROVED SWITCHGEAR SENSOR DATA COMMUNICATION

(71) Applicant: HUBBELL INCORPORATED, Shelton, CT (US)

(72) Inventor: Balaji Santhanam, Parsippany, NJ (US)

(73) Assignee: HUBBELL INCORPORATED, Shelton, CT (US)

( * ) Notice: Subject to any disclaimer, the term of this patent is extended or adjusted under 35 U.S.C. 154(b) by 294 days.

(21) Appl. No.: 18/495,516

(22) Filed: Oct. 26, 2023

(65) Prior Publication Data

US 2024/0145193 A1     May 2, 2024

Related U.S. Application Data

(60) Provisional application No. 63/421,652, filed on Nov. 2, 2022.

(51) Int. Cl.
| | |
|---|---|
| *H01H 33/42* | (2006.01) |
| *H01H 31/00* | (2006.01) |
| *H01H 33/666* | (2006.01) |
| *H02B 13/035* | (2006.01) |
| *H02B 13/045* | (2006.01) |

(52) U.S. Cl.
CPC .......... *H01H 33/42* (2013.01); *H01H 31/003* (2013.01); *H01H 33/666* (2013.01); *H02B 13/0352* (2013.01); *H02B 13/045* (2013.01)

(58) Field of Classification Search
CPC .... H01H 33/42; H01H 33/666; H01H 31/003; H01H 9/168; H02B 13/0352; H02B 13/045; G01R 21/133; G01R 22/063; G01R 19/25; G01R 15/12; G01R 31/27; G01R 31/327

USPC ........ 218/84, 78, 92, 100; 702/62, 6, 64, 74, 702/80, 189, 60; 324/76.11
See application file for complete search history.

(56) References Cited

U.S. PATENT DOCUMENTS

| | | | | |
|---|---|---|---|---|
| 7,133,271 B2 * | 11/2006 | Jonas | ................... | H01H 33/027 361/115 |
| 9,891,682 B1 * | 2/2018 | Czamara | ................. | G06F 1/266 |

(Continued)

OTHER PUBLICATIONS

International Search Report dated Jan. 17, 2024, which issued in the PCT Patent Application No. PCT/US2023/036551.

*Primary Examiner* — William A Bolton
(74) *Attorney, Agent, or Firm* — Dickinson Wright PLLC

(57) ABSTRACT

Devices, systems and methods are provided to improve communication of switch sensor and status signals between a medium voltage overheard switchgear and an intelligent electronic device (IED). A switchgear interface device is deployed proximally to a switchgear and/or junction box situated at a distal end of a utility pole. The switchgear interface device (SID) receives, processes and combines sensor signals and status signals from switches in the switchgear with metadata for transport as digital signals to an IED mounted at the other end of the utility pole. The cabling for sensor and status signals between the SID and the IED can be fiber or Ethernet. The digital signals can be formatted using the IEC61850 standard. The SID can have drive electronics and send open and close command signals to the switches to eliminate the need for a multi-pin connector cable for transport of switch power signals from the IED.

20 Claims, 11 Drawing Sheets

(56)         References Cited

U.S. PATENT DOCUMENTS

| | | | |
|---|---|---|---|
| 10,868,414 B2 * | 12/2020 | Laglenne | H02G 7/12 |
| 11,258,249 B2 * | 2/2022 | Schweitzer, III | H02H 7/261 |
| 2009/0289637 A1 | 11/2009 | Radtke | |
| 2010/0153036 A1 | 6/2010 | Elwarry et al. | |
| 2015/0185748 A1 * | 7/2015 | Ishchenko | G05F 1/66 |
| | | | 700/292 |
| 2019/0041920 A1 | 2/2019 | Spanier et al. | |
| 2020/0159266 A1 * | 5/2020 | Kerr | G05F 1/46 |
| 2021/0088561 A1 * | 3/2021 | Mobley | G01R 19/0092 |
| 2021/0234360 A1 * | 7/2021 | Agliata | H01H 71/10 |
| 2022/0029407 A1 * | 1/2022 | Patel | H02H 3/06 |

* cited by examiner

APPARATUSES AND METHODS FOR IMPROVED SWITCHGEAR SENSOR DATA COMMUNICATION

This application claims the benefit of U.S. Provisional Patent Application Ser. No. 63/421,652, filed on Nov. 2, 2022, which is hereby incorporated herein by reference in its entirety.

BACKGROUND

Field

Illustrative embodiments relate generally to apparatuses and methods for improved communication of data related to sensing of voltage, current and other status conditions at a switchgear switch (e.g., a switchgear switch deployed at a medium voltage overhead switchgear), and processing and combining of the sensor data at the switchgear switch or at a junction box on a utility pole. Illustrative embodiments also relate generally to apparatuses and methods for simplified and more reliable communication of sensor data and status signals between the switchgear and remote switchgear controllers and other power distribution controller and monitoring equipment with fewer losses and greater accuracy.

Description of Related Art

Automatic circuit reclosers are a class of distribution switchgear which is designed primarily for use on overhead electricity distribution circuits to detect and interrupt fault currents. These switchgears are essentially high voltage circuit breakers with two primary functions: 1) sense current and voltage on the circuit (e.g., a phase conductor); and 2) interrupt load and/or fault currents. A switchgear switch is provided on each phase conductor of a switchgear. A switchgear switch can be repeatedly opened and closed rapidly and temporarily (e.g., until a temporary fault condition clears), or opened indefinitely (e.g., when an unwanted load or fault condition is not temporary and maintenance of the phase conductor is needed).

A switchgear switch can be operated automatically via a controller, or manually operated. Most recloser switchgears that are commercially available are based on vacuum interruption, solid dielectric insulation and magnetic actuation technology for operating a switchgear switch. A switchgear switch also has current and voltage sensors on its corresponding phase conductor. An embedded current sensor in the switchgear switch is generally a bushing current transformer (CT), and an embedded voltage sensor is either a resistive or capacitive divider for the line or source side. The switchgear switch circuits can each also have an optional additional voltage sensor for the load side.

FIGS. 1A and 1B depict a typical recloser switchgear located on a distal end of a utility pole, and a cabinet with a controller located at a proximal end of the utility pole for convenient service access at ground level. A cable connects a recloser switchgear switch, or each of three switchgear switches provided to respective ones of three phase conductors in a three phase recloser, to the controller cabinet and correspondingly to the controller components therein. As described in more detail below, the cable has, for example, conductors to transmit sensor data from the switchgear sensors on each phase conductor to the controller, and conductors that provide open to close switch power signals and close to open switch power signals from the controller to the switchgear switch on each phase conductor, among other conductors with switch status and optionally DC power.

SUMMARY

The above and other problems are overcome, and additional advantages are realized, by illustrative embodiments.

In accordance with an illustrative embodiment, a method of communication between a medium voltage overheard switchgear and an intelligent electronic device (IED) is provided. The switchgear is mounted on a distal end of a utility pole and connected to an electric power distribution line, and the utility pole has a proximal end secured to a ground support. The IED is secured at the proximal end. The switchgear has sensors at a switch provided at one of three phase conductors associated with the power distribution line. The method comprises: receiving analog signals providing representations of current and voltage measured by the sensors at the switch, and at least one status signal indicating one of an opened status and closed status of the switch; digitizing the analog signals to generate corresponding digital inputs therefrom; sampling the digital inputs; combining the samples into a set of merged digital samples having a designated format and comprising digital representations of the current or voltage of the corresponding one of the phase conductors measured by the sensors, the status signal, and metadata, the metadata chosen from identification of which of the sensors that corresponding ones of the digital samples originated from, identification of the switch, at least one of identification and location data of the switchgear; performing the receiving, digitizing, sampling and combining via one or more components at a switchgear interface device located proximally to the switch and the distal end of a utility pole; and providing the merged digital samples and the metadata as outputs to a digital data connector located at the switchgear interface device and configured to be connected to a digital data cable.

In accordance with aspects of illustrative embodiments, the method further comprises connecting a digital data cable between the digital data connector and the IED, the digital data cable chosen from an optical fiber cable and an Ethernet cable, and the digital data connector chosen from a fiber cable connector and an Ethernet cable connector that corresponds to the digital data cable.

In accordance with aspects of illustrative embodiments, the combining comprises formatting the merged digital samples using an IEC61850 standard from International Electrotechnical Commission (IEC).

In accordance with aspects of illustrative embodiments, combining comprises: formatting the merged digital samples using an IEC61850-9-2 protocol from the IEC, the merged digital samples being encoded in multicast Ethernet frames; and transmitting the merged digital samples unacknowledged data from the switchgear interface device operating as a publisher in accordance with the IEC61850-9-2 protocol to subscribers comprising the IED.

In accordance with aspects of illustrative embodiments, the combining further comprises providing global positioning system (GPS) time synchronization to the merged digital samples.

In accordance with an illustrative embodiment, a switchgear interface device is provided. The switchgear interface device can be used, for example, for a medium voltage overhead switchgear mounted on a distal end of a utility pole and connected to an electric power distribution line. The utility pole has a proximal end secured to a ground support and a cabinet with an intelligent electronic device (IED) secured at the proximal end. The switchgear has sensors at a switch provided at one of three phase conductors associated with the power distribution line. In accordance with an illustrative embodiment, the example switchgear interface device comprises: a housing configured to be disposed adjacent the switchgear and mounted on the distal end of the utility pole; a plurality of inputs at the housing configured to receive analog signals providing representations of current or voltage measured by the sensors at the switch, and to receive at least one status signal indicating one of an opened and closed status of the switch; a processor; a memory; and a digital data connector. The processor is disposed within the housing and configured to digitize the analog signals and the at least one status signal to generate corresponding digital inputs therefrom, sample the digital inputs, and combine the samples into a set of merged digital samples having a designated format and comprising digital representations of the current and voltage of the corresponding one of the phase conductors measured by the sensors, the status signal, and metadata. The metadata is chosen from identification of which of the sensors that corresponding ones of the digital samples originated from, identification of the switch, at least one of identification and location data of the switchgear. The memory is disposed within the housing and configured to store the set of merged digital samples. The digital data connector is connected to the housing and configured to be connected to a digital data cable chosen from an optical fiber cable and an Ethernet cable and to provide the merged digital samples and the metadata as outputs to the digital data cable and the IED when the digital data cable connects the digital data connector and the IED, the digital data connector chosen from a fiber cable connector and an Ethernet cable connector that corresponds to the digital data cable.

In accordance with aspects of illustrative embodiments, the switchgear interface device further comprises drive electronics and an energy storage device to power the drive electronics. The processor is configured to receive at the digital data connector a switch command signal transmitted from the IED via the digital data cable and to operate the drive electronics to send a switch power signal to the switch to open or close in accordance with the switch command signal.

In accordance with aspects of illustrative embodiments, the switchgear interface device further comprises a switch power signals connector connected to the housing and configured to be connected to a second cable separate from the digital data cable and to receive switch power signals comprising a close to open signal and an open to close signal for the switch from the IED via the second cable when the second cable connects the switch power signals connector and the IED. The switch power signals connector comprises at least one of pins and receptacles that receive corresponding ones of the switch power signals and provides them to a terminal block in the housing that is electrically connected to a switch actuation mechanism in the switch.

In accordance with aspects of illustrative embodiments, the switchgear interface device uses an IEC61850 standard from International Electrotechnical Commission (IEC) as the designated format.

In accordance with aspects of illustrative embodiments, the processor of the switchgear interface device is configured to employ an IEC61850-9-2 protocol from the IEC wherein the processor operates as a publisher and transmits unacknowledged data to subscribers comprising the IED, and the unacknowledged data comprises the merged digital samples encoded in multicast Ethernet frames.

In accordance with aspects of illustrative embodiments, the processor of the switchgear interface device is configured to employ global positioning system (GPS) time synchronization of the merged digital samples.

In accordance with aspects of illustrative embodiments, the switchgear has a second switch and a third switch provided respectively at the other two of the three phase conductors. The plurality of inputs at the housing of the switchgear interface device are configured to receive analog signals providing representations of current or voltage measured by sensors provided at each of the second switch and the third switch, and to receive status signals indicating one of an opened and closed status of the second switch and the third switch. The processor of the switchgear interface device is configured to digitize the analog signals and the status signals from the second switch and the third switch to generate corresponding digital inputs therefrom, sample the digital inputs and combine the samples into the set of merged digital samples having the designated format such that the set of merged digital samples generated by the processor further comprises digital representations of the current and voltage of the other two of the phase conductors measured by their corresponding sensor, the status signals of each of the switches at the other two of the phase conductors, and the metadata corresponding to the second switch and the third switch and the sensors for the other two of the phase conductors.

In accordance with an illustrative embodiment, a switchgear interface device is provided. The switchgear interface device can be used, for example, with a medium voltage overhead switchgear mounted on a distal end of a utility pole and connected to an electric power distribution line, the utility pole having a proximal end secured to a ground support and a cabinet with an intelligent electronic device (IED) secured at the proximal end. The switchgear has sensors at a switch provided at one of three phase conductors associated with the power distribution line. The switchgear is disposed adjacent to a junction box at the distal end of the utility pole. The switchgear interface device (SID) comprises switch SID components arranged proximally to and electrically connected to the switch. The switch SID components comprise a processor configured to receive analog signals from the sensors that are representations of current or voltage measured by the sensor at the switch, and at least one status signal indicating one of an opened status and a closed status of the switch. The processor is configured to digitize the analog signals and the at least one status signal to generate corresponding digital outputs therefrom, sample the digital outputs, and combine the samples into a set of merged digital samples having a designated format and comprising digital representations of the current and voltage of the corresponding one of the phase conductors measured by the sensors, the status signal, and metadata. The metadata is chosen from identification of which of the sensors that corresponding ones of the digital samples originated from, identification of the switch, at least one of identification and location data of the switchgear. The switch SID components also comprise a memory configured to store the set of merged digital samples, and a digital data connector configured to be connected to a digital data cable chosen from an optical fiber cable and an Ethernet cable and to provide the merged digital samples and the metadata to the junction box when the digital data cable connects the digital data connector and the junction box. The digital data connector is chosen from a fiber cable connector and an Ethernet cable connector that corresponds to the digital data cable.

In accordance with aspects of illustrative embodiments, the switchgear interface device further comprises: a second digital data connector mounted on the junction box and configured to be connected to the digital data cable and to receive the merged digital samples and the metadata from the switch SID components when the digital data cable connects the digital data connector and the second digital data connector on the junction box; a third digital data connector connected to the junction box and configured to be connected to a second digital data cable chosen from an optical fiber cable and an Ethernet cable and to provide the merged digital samples and the metadata as outputs to the second digital data cable and the IED when the second digital data cable connects the third digital data connector and the IED, and a communications hub. The third digital data connector is chosen from a fiber cable connector and an Ethernet cable connector that corresponds to the second digital data cable. The communications hub is provided in the junction box and has a plurality of ports and is configured to provide signals received at one of the ports to one or more of the other ones of the plurality of ports, the second digital data connector and the third digital data connector connected to respective ones of two of the plurality of ports. The communications hub is operable to provide the merged digital samples and the metadata received at the second digital data connector to the third digital data connector.

In accordance with aspects of illustrative embodiments, the switchgear interface device further comprises drive electronics in the junction box and an energy storage device in the junction box to power the drive electronics; and a multi-pin connector at each of the junction box and switch that interfaces with a switch power signals cable that is separate from the digital data cable. The multi-pin connector at the switch is electrically connected to an actuation mechanism for the switch, and the multi-pin connector at the junction box is electrically connected to the drive electronics. The processor is configured to receive at the digital data connector a switch command signal transmitted from the IED via the communications hub, the second digital data cable, and the digital data cable, and to send a control signal to the drive electronics via the digital data cable to operate the drive electronics to send a switch power signal to the switch to open or close in accordance with the switch command signal. The switch power signals cable transmits the switch power signal to the switch.

In accordance with aspects of illustrative embodiments, the switchgear interface device uses an IEC61850 standard from International Electrotechnical Commission (IEC) as the designated format.

In accordance with aspects of illustrative embodiments, the processor of the switchgear interface device is configured to employ an IEC61850-9-2 protocol from the IEC wherein the processor operates as a publisher and transmits unacknowledged data to subscribers comprising the IED, and the unacknowledged data comprises the merged digital samples encoded in multicast Ethernet frames.

In accordance with aspects of illustrative embodiments, the processor of the switchgear interface device is configured to employ global positioning system (GPS) time synchronization of the merged digital samples.

In accordance with aspects of illustrative embodiments, the switchgear comprises a second switch provided at the other two of the three phase conductors, and the switchgear interface device further comprises a second electronic circuit arranged proximally to the second switch. The second switch signal conditioning circuit comprises: a second processor configured to receive analog signals that are representations of current or voltage measured by sensors at the second switch, and at least one status signal indicating one of an opened status and a closed status of the second switch, to digitize the analog signals and the at least one status signal corresponding to the second switch to generate corresponding digital outputs therefrom, to sample the digital outputs of the second switch; and a second memory configured to store the samples of the second switch.

In accordance with aspects of illustrative embodiments, the processor of the switchgear interface device comprises a data conversion and combining device that is configured to combine the stored samples from the second switch into a second set of merged digital samples having the designated format and comprising digital representations of the current and voltage measured at the second switch, at least one status signal corresponding to the second switch, and second metadata chosen from identification of which of the second set of sensors that corresponding ones of the digital samples originated from, identification of the second switch, and at least one of identification and location data of the switchgear. The data conversion and combining device is configured to combine the set of merged digital samples and the second set of merged digital samples and provide them to the junction box via the digital data connector.

Additional and/or other aspects and advantages of illustrative embodiments will be set forth in the description that follows, or will be apparent from the description, or may be learned by practice of the illustrative embodiments. The illustrative embodiments may comprise switchgear interface devices and methods for operating same having one or more of the above aspects, and/or one or more of the features and combinations thereof. The illustrative embodiments may comprise one or more of the features and/or combinations of the above aspects as recited, for example, in the attached claims.

BRIEF DESCRIPTION OF THE DRAWINGS

Aspects and advantages of the illustrative embodiments will be more readily appreciated from the following detailed description, taken in conjunction with the accompanying drawings, of which.

Throughout the drawing figures, like reference numbers will be understood to refer to like elements, features and structures.

DETAILED DESCRIPTION OF ILLUSTRATIVE EMBODIMENTS

Figures 1A, 1B:
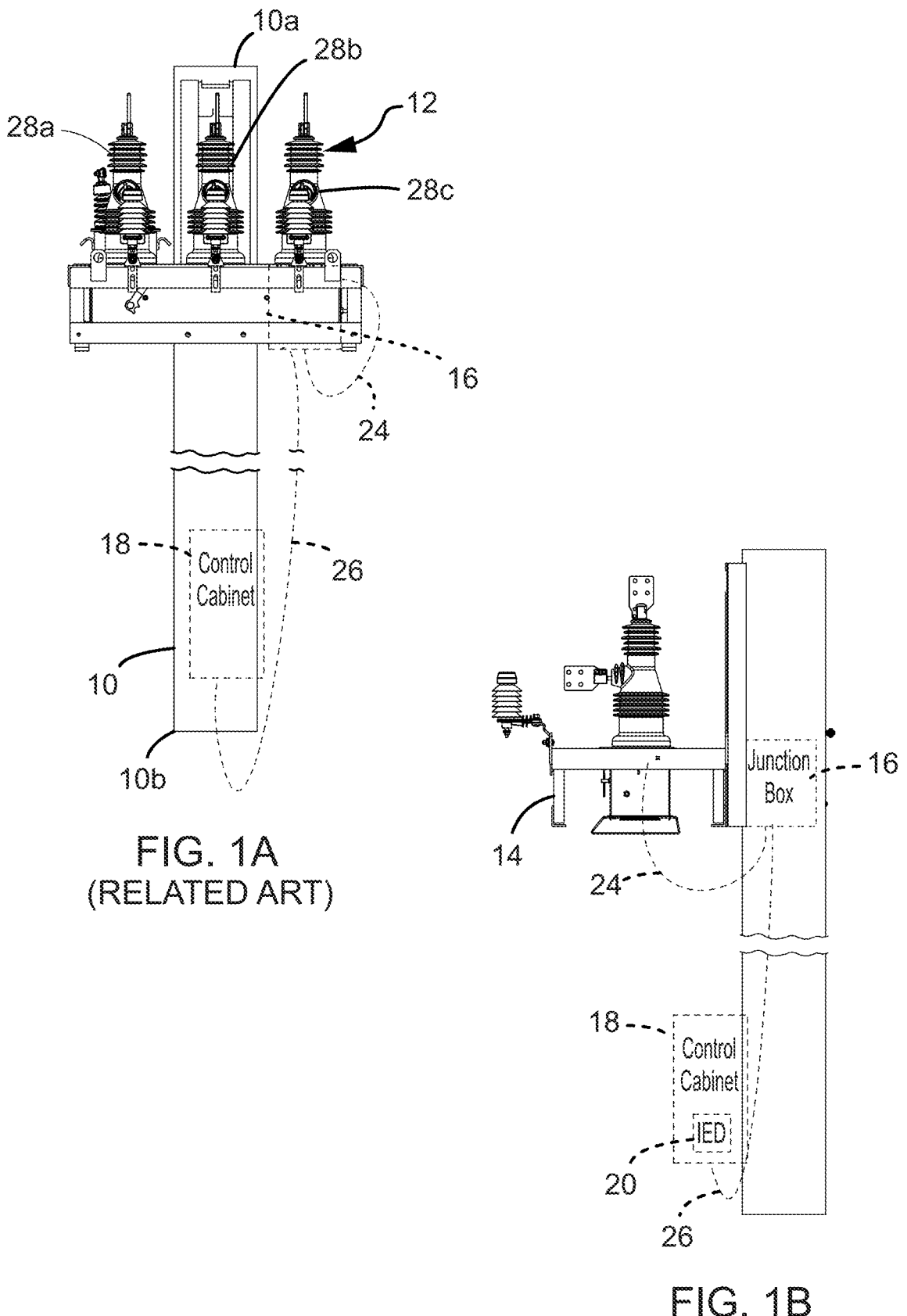
FIGS. 1A and 1B depict, respectively, front and side views of an example conventional switchgear mounted on a utility pole and connected to a conventional control cabinet by a junction box and a conventional cable.

Reference will now be made in detail to illustrative embodiments, which are depicted in the accompanying drawings. The embodiments described herein exemplify, but do not limit, the illustrative embodiments by referring to the drawings.

Example embodiments of the present disclosure provide a technical solution to several technical problems which will now described.

Utilities are generally satisfied with the high current interruption and dielectric performance of a switchgear. However, the sensing performance of this category of switchgear is an area with which most stakeholders (e.g., utilities, maintenance and monitoring vendors and contractors, and utility customers) are not satisfied. For instance, most reclosers that are currently commercially available offer a range of ±1-2% accuracy within load current ranges (e.g., around 630-800 A) and a range of ±2-4% accuracy in voltage sensing. Furthermore, the fault current accuracy is often not published by recloser manufacturers, and tends to be even less, i.e., at a larger range of more than ±3-5%.

In addition to an unsatisfactory level of accuracy of the sensor data received from the switchgear, other areas such as linearity, precision and higher degree harmonic response are also below customer requirements and expectations. For example, as utilities are trying to address more complex problems in the power distribution grid, reclosers serve as critical assets on a utility's distribution system, and therefore utilities expect more functionality and performance from these devices. Some examples of such complex problems are (a) power quality issues due to a growing inverter based generation, and (b) insufficient or lack of high impedance fault detection, broken conductor detection, open neutral detection, and/or sectionalizing and coordination of reclosers. Addressing the afore-mentioned (b) problems is particularly needed in shorter feeders that have high numbers of customers in order to reduce the number of customers impacted by a particular service interruption.

Figures 1C, 1D, 1E:
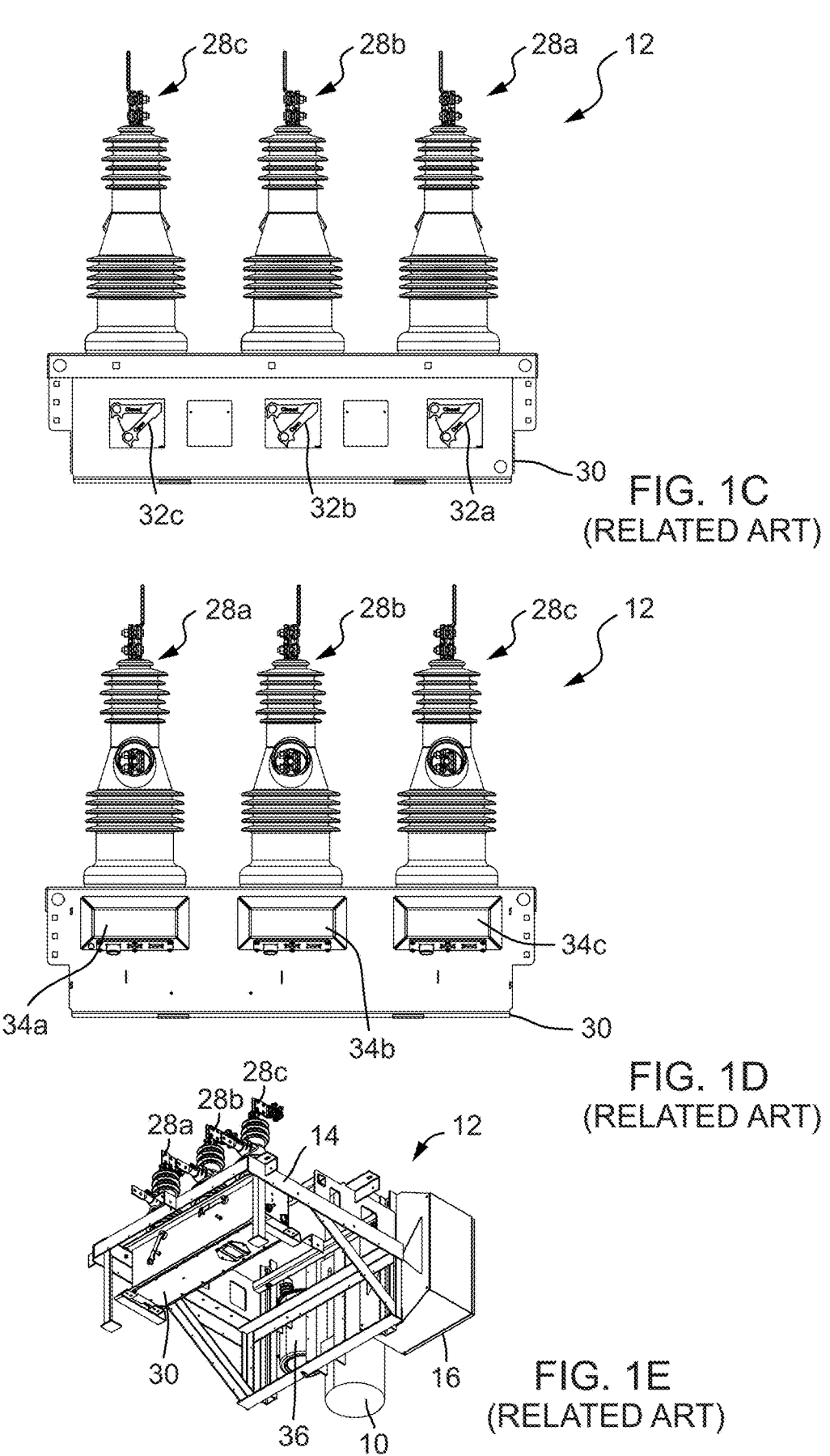
FIGS. 1C and 1D depict, respectively, back and front views of an example conventional three phase switchgear having three switches mounted in a single base housing.
FIG. 1E is a perspective view of the switches and base housing mounted on the utility pole.
Figures 1F, 1G, 1H:
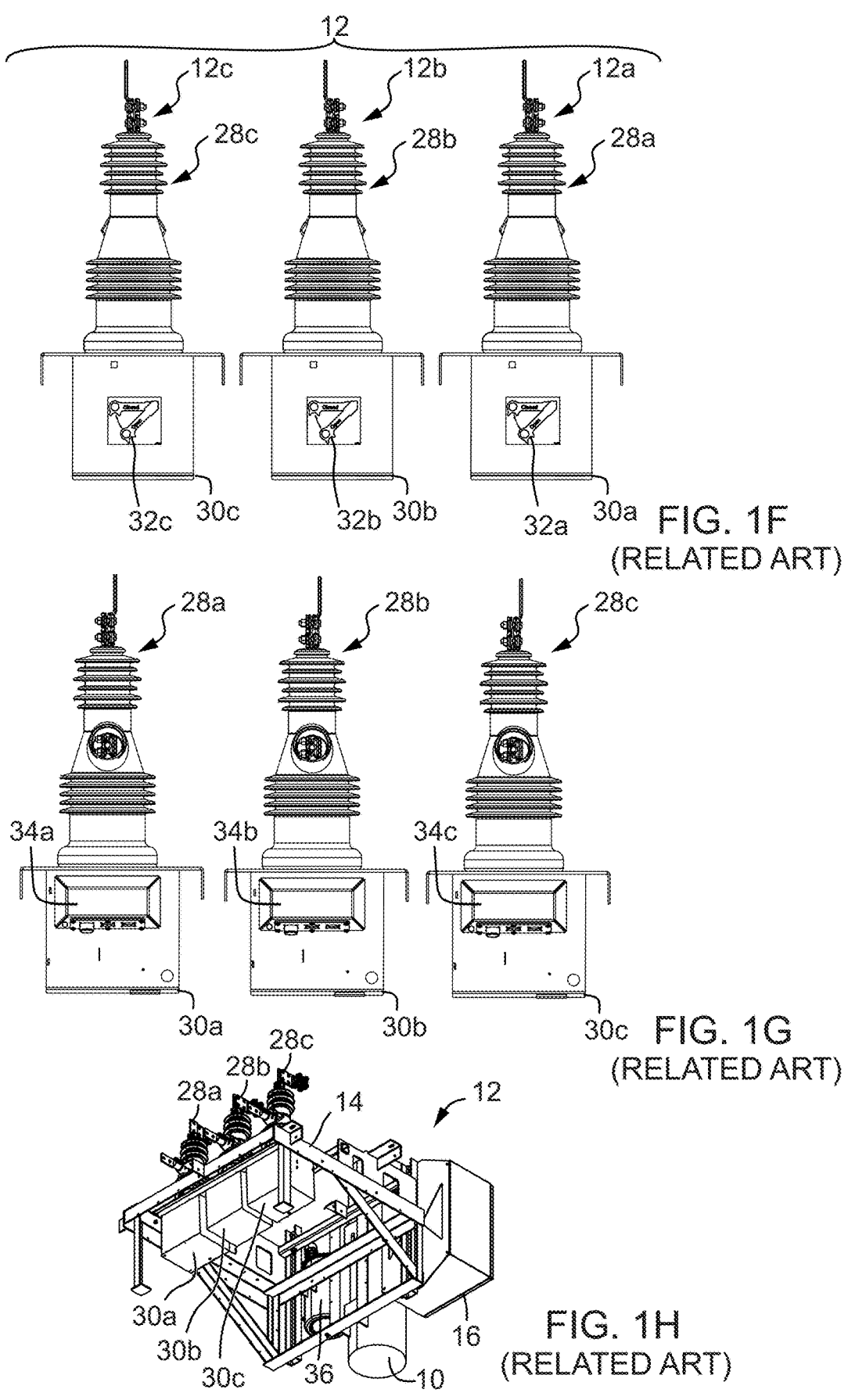
FIGS. 1F and 1G depict, respectively, back and front views of three example conventional single phase switchgears each having a switch with a dedicated base housing.
FIG. 1H is a perspective view of the three single phase switchgears mounted on the utility pole.

In accordance with aspects of example embodiments of the present disclosure, existing sub-standard performance in current and voltage sensing of a switchgear is addressed, and therefore shortcomings in related applications for the distribution system, are improved using a fundamentally different architecture for switchgear signal access and communication when compared to an existing switchgear and controller system. For purposes of discussion, an example switchgear 12 and controller 20 are shown in FIGS. 1A and 1B. The switchgear 12 can be, for example, LIBERTY™ HB series pole-mounted three phase ganged recloser available from Hubbell Incorporated, Shelton, Connecticut, USA, or a Viper ST commercially available from G & W Electric Company, Bolinbrook, Illinois, USA, among others. The controller or intelligent electronic device (IED) 20 can be, for example, a SEL-651-2 Recloser Control commercially available from Schweitzer Engineering Laboratories, Inc., Pullman, Washington, USA, or a Model M-7879 R-PAC protection, automation, and control system commercially available from Beckwith Electric Co., Inc. Largo, Florida, USA, among others, or as described in commonly assigned U.S. Published Patent Application No. 2021/0234360, the entire contents of which are incorporated herein by reference. It is to be understood that different switchgears 12 and controllers 20 can be used. As indicated in FIGS. 1C through IE, an example switchgear 12 can be a conventional three phase switchgear having three switches 28*a-c* mounted in a single base housing 30. FIGS. 1F through 1H depict three example conventional single phase switchgears 12*a-c*, each having a switch 28*a-c* with a dedicated base housing 30*a-c*. FIGS. 1E and 1H show the switchgear(s) 12 mounted to a utility pole 10 using a mounting bracket 14, and a junction box 16 and a potential transformer 36 also secured to the mounting bracket. The junction box 16 can alternatively be mounted directly to the utility pose. One or more cables 24 connect the switchgears 12 to the junction box 16. Only one cable 24 from the switchgear 12 to the junction box 16 is shown in FIGS. 1A and 1B for clarity. The fronts of the example switchgears 12 shown in FIGS. 1D and 1G have an access panel 34*a-c* for each switch 28*a-c* with connector for a cable and other electronic components such as a visual indicator 48 (FIG. 2A) for switch status. The back of each switchgear 12 shown in FIGS. 1C and 1F has a manual trip handle 32*a-c* for a corresponding switch 28*a-c*. In traditional reclosers 12, the junction box 16 is generally an enclosure that serves as a common meeting point for electrical wires from the recloser switches 28, where the wires connect before moving on to the recloser controller IED 20 in a single multi-pin cable assembly 26.

Figure 2A:
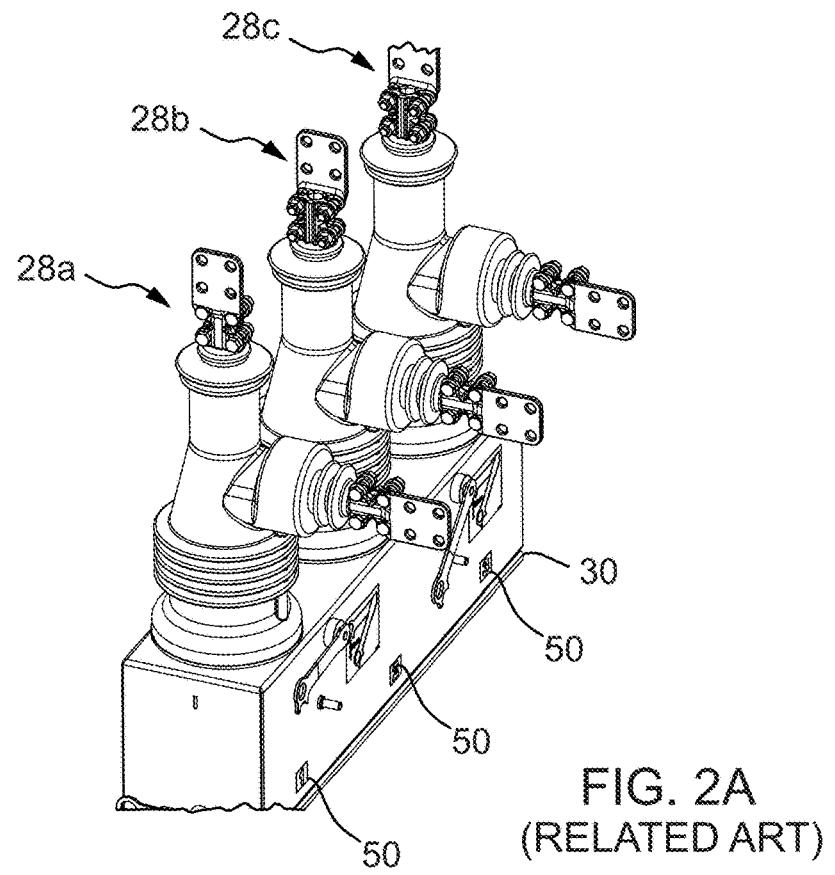
FIGS. 2A and 2B are perspective and side views, respectively, of an example switchgear and its related components.
Figure 2B:
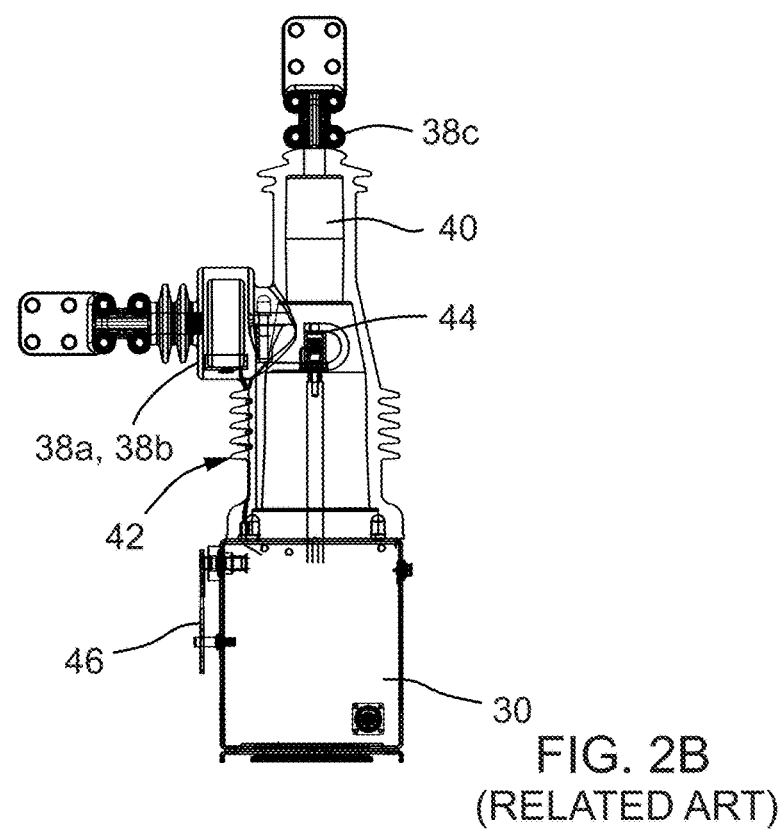

With reference to FIGS. 2A and 2B, an example recloser switchgear 12 is shown. The phase conductors and the lines connecting the phase conductors to respective switches 28*a-c* are omitted for clarity, and lines between a controller 20 or a junction box 16 and the switches 28*a-c* (e.g., for switch actuation or status indication) are also omitted for clarity. Each switch 28 connected to a corresponding phase conductor has a vacuum interrupter 40, a drive assembly 42, and a magnetic actuator 44 operated (e.g., via signals from an IED 20) to open from a closed position or close from an open position relative to its phase conductor. The switch 28 can also be operated via a manual trip handle 46 and an optional position indicator 48 can be provided. As stated above, switchgear switches 28 each have a current sensor 38*a* and at least one voltage sensor 38*b* for monitoring the corresponding phase conductor. A recloser switchgear 12 typically contains a bushing current transformer (CT) 38a with a 1000:1 or 500:1 ratio, and one or more voltage sensors 38b,38c with ranges from 10000:1 to 2000:1 ratios. Therefore, sensor signals produced by the switchgear 12 are in generally in the order of a few amperes (A) or volts (V). For instance, on a 7200V line carrying 100A load current per phase, the output of the sensors can be 0.72V and 1 A. As described below, these signals are subjected to significant signal losses in existing configurations of switchgears 12 on utility poles 10 which results in unsatisfactory accuracy.

With continued reference to FIGS. 1A and 1B, these overhead reclosers 12 are often mounted at a 40-50 foot height above ground level on poles 10, and are connected to an intelligent electronic device (IED) or recloser controller 20 in a control cabinet 18 that is mounted closer to ground level (e.g., at 3-6 feet above the ground at the pole 10) for access by technicians to replace controller 20 batteries and perform configuration and calibration among other operations. The individual phase recloser switches 12 are wired connected into a common junction box 16 that is mounted on the mounting rack 14 of the switchgear 12 or on the pole 10 proximally to the switchgear 12. Cable(s) 26 are then used to connect the elevated junction box to the ground-accessible controller cabinet.

Figure 3A:
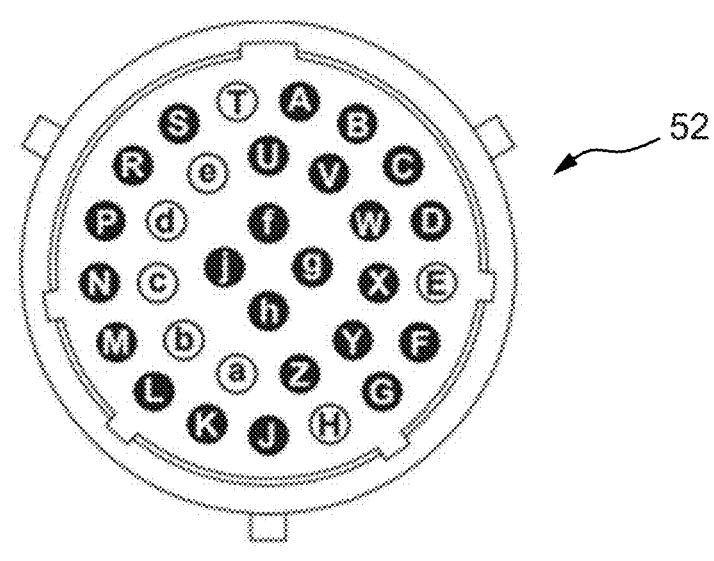
FIG. 3A depicts a cross-section of a connector of the conventional cable deployed between the junction box and the control cabinet in the arrangement depicted in FIG. 1A.
Figure 3B:
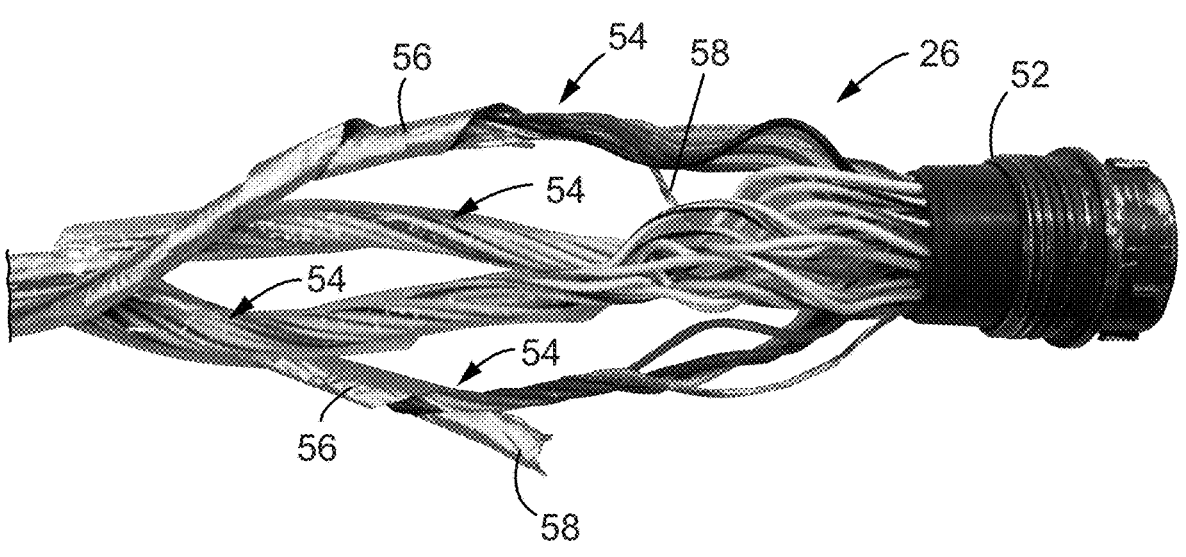
FIG. 3B depicts a partial side view of wires in the conventional cable deployed in the arrangement depicted in FIG. 1A.
Figure 4:
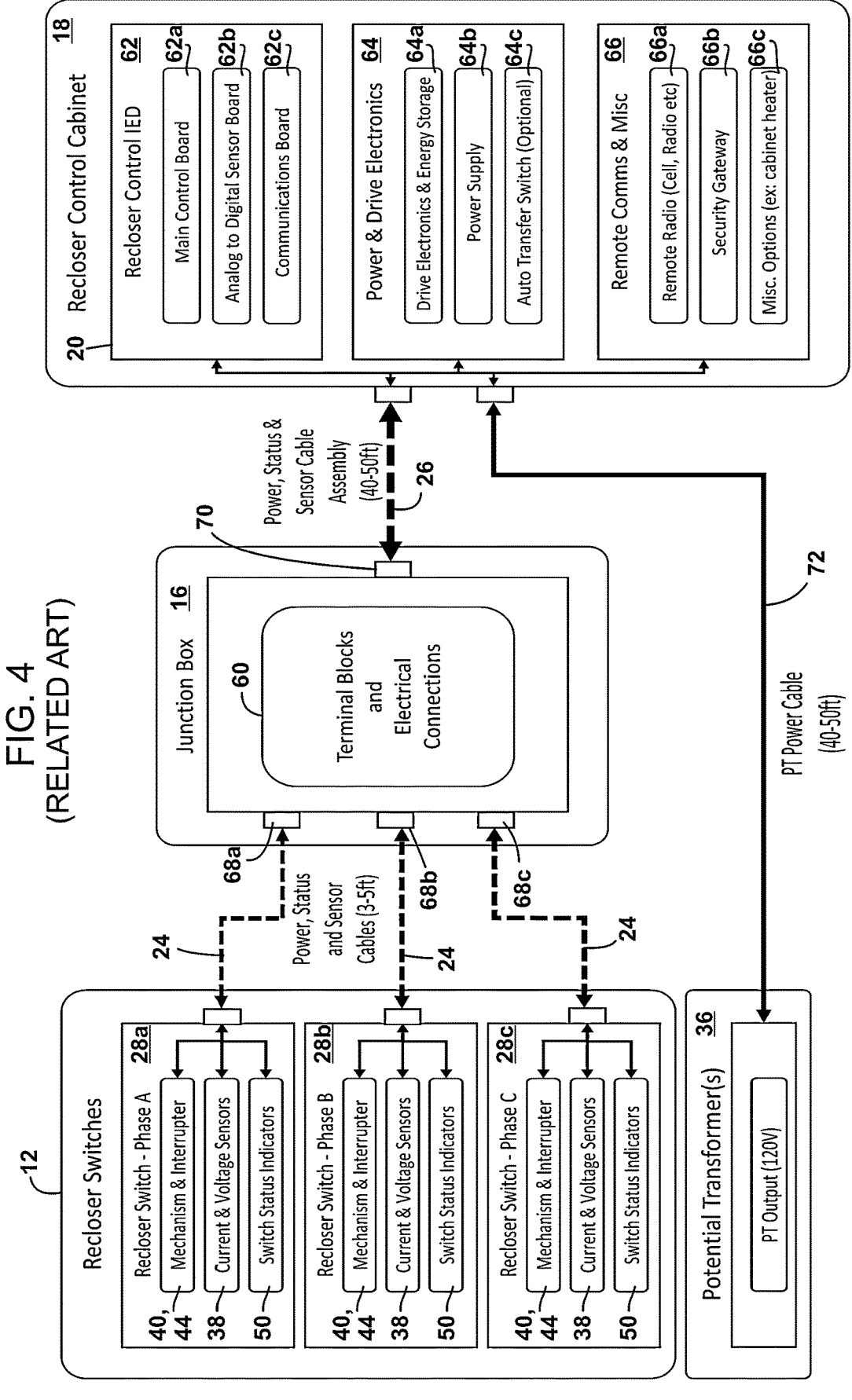
FIG. 4 is a block diagram of components in the switchgear, junction box and control cabinet interface in the arrangement depicted in FIG. 1A.

FIG. 4 depicts example components in a conventional switchgear 12, a junction box 16 and a control cabinet 18. Three switches 28a-c of an example recloser switchgear 12 are shown, with each switch 28 having a switch activation mechanism 44 and interrupter 40 for the phase conductor, current and voltage sensors 38a-c, and switch status indicators 50. A potential transformer 36 is also shown. The switches 28a-c are each connected to a junction box 16 by a power, status and sensor cable 24 of a length on the order of 3-5 feet, typically. The switchgear 12 and the junction box 16 each have corresponding connectors (e.g., an 8-pin count multi-pin connector 68). The junction box comprises terminal block(s) 60 with the multi-pin connectors 68, 70 and other electrical connections to provide the switch power signals from the IED 20 to the corresponding recloser switch cable connector 68a-c, and the sensor signals and status signals from the switches 28a-c to the IED 20. In the control cabinet 18, the IED 20 generally comprises, for example, a main control board 62a, an analog to digital sensor board 62b, and a communications board 62c. The power and drive electronics 64 can comprise, for example, drive electronics 64a and energy storage devices 64b such as capacitors that power from a power supply such as a battery provided in the cabinet. The battery provides power to other cabinet components and can be charged from a DC power signal obtained by a potential transformer on the switchgear. The power and drive electronics 64 can also comprise an optional automatic transfer switch 64c. The remote communications equipment 66 can comprise, for example, a wireless communication device 66a such as a cellular transceiver or radio transceiver. A security gateway 66b can be provided for when the IED 20 transmits switchgear status and operational information to remote devices such as a utility power distribution management control station. Other miscellaneous components 66c can be provided in the controller cabinet such as a cabinet heater. A power cable 72 on the order of 40-50 feet connects the potential transformer to the control cabinet to provide power thereto. As described below in connection with FIGS. 3A and 3B, a high pin count multi-pin connector 70 is provided on the IED side of the junction box 16 to connect to the control cabinet 18 using a high pin count multi-pin cable 26.

The existing cables 26 that are used to connect a junction box 16 and a control cabinet 18 are therefore typically 40-50 feet in length, and are quite complicated and expensive. These cables 26 each comprise a cable assembly of different pin count range of anywhere from a 14-pin to a 42-pin connection interface and have various conductors that carry several different kinds of signals such as low voltage or low ampere sensor data, high power open/close switch power signals, and switch status signals between the recloser switchgear and the controller device (e.g., IED) in the control cabinet. When sensitive voltage or current sensor signals (e.g., which are on the order of <1V and 1 A as stated above) are sent from the switchgear 12 via one of these 40-50 foot cable 26 assemblies, each cable 26 assembly causes a loss of magnitude accuracy, a loss of phase accuracy, induced noise due to signal interference and grounding issues.

Reasons for these losses in a conventional cable 26 and other disadvantages of a conventional cable 26 will now be described with reference to FIGS. 3A and 3B. An example 32-pin connection interface 52 is shown in FIG. 3A for an example cable 26. FIG. 3B is a partial side view of the cable 26 assembly with outer sheathing removed and bundles of wires 54₁₋₄ partially disassembled for a better view of the various wiring and shielding components in the cable assembly. Generally, a conventional cable 26 between a switchgear 12 and control cabinet 18 comprises different bundles of wires 5414, including: first and/or second bundles of wires 54₁₋₂ carrying voltage signals from the voltage sensor(s) 38b,38c at the respective phase conductor(s) of single phase or tri-phase distribution line; a third bundle of wires 54₃ carrying current signals from the current transformer 38a in each of the recloser switchgear switches 28a-c connected to the respective phase conductors and switchgear switch status signal(s); and a fourth bundle of wires 54₄ carrying open to close and close to open command signals for each switch 28a-c. As shown in FIG. 3A, the cable connector 52 has plural pin receptacles for respective voltage sensor signal wires (e.g., one or two such wires per switchgear switch provided on a phase conductor), current sensor signal wires (e.g., at least one wire per switchgear switch), switch status signal wires, and a pair of open to close and close to open switch power signal wires per switchgear switch. Conventional cables 26 carrying sensor data or signals are subject to inherent capacitance as charge builds up across insulation between the cable wires over time as wires transmit voltage signals. This capacitance results in delay and interference in signal transmission.

Conventional cables 26 are configured to minimize unwanted capacitive coupling between the cable 26 assembly components by using a number of different approaches. For example, load and source voltage signal wires are separated and a ground wire (not shown) is added that contacts all of these wires and is connected end to end in the cable assembly. Support wire(s) is provided to add stiffness to the heavy cable to reduce strain on the wire bundles. Shielding (e.g., aluminum foil 56) can be provided on the separate load and source voltage bundles and is connected to a drain wire 58 that is connected end to end in the cable 26 assembly.

As shown in FIGS. 3A and 3B, the design of a conventional cable 26 is intricate due to the number of wires extending between the switchgear 12 and control cabinet 16 and the capacitive coupling mitigation materials and configuration, and the intricate multi-pin connector(s) 70 used to interface the wires to the control cabinet and the junction box 16; therefore, the cable 26 is expensive. Other drawbacks are that, even with shielding, the signals transmitted along the cable 26 still require calibration with a factor to correct the inherent capacitance. Such calibration needs to be performed using a high precision voltage divider and high potential (Hipot) electrical safety tester, along with the cable 26 length used in specific application (i.e., for the ratio correction factor (RCF)). Also, with increasing length, these conventional cables 26 also introduce undesirable increases in phase shift in the sensor signal data which contributes to the increased inaccuracy of the sensor signal data due to its transmission along the cable 26. Utilities also have to factor in the considerable weight of these complex conventional cables 26 into a projected reduction in the life of the junction box 16 and/or the control cabinet 18 that interface with the cable 26 due to torque and therefore increased wear on the cabinet 18 or junction box 16 wires and connectors that results from the cable weight. To assist with installation and secure mounting of a convention cable 26, the cable connector 52, 70 can have a twist lock feature. The multi-pin connector 52 needs to also be potted correctly (e.g., subject to backpotting using a selected resin fill material) to hold all of the 14-42 or more wires in place. The backpotting process for the cable connector 52 is itself a complicated process. Thus, the cable connectors 52 for such complex multi-wire cables 26 add to the complexity and cost of a conventional cable 26 for a recloser controller connection, and require special handling that further complicates installation of a conventional cable 26 in the field.

Example embodiments of the present disclosure provide a switchgear interface device (SID) 80 and method of using same that improve the quality of the sensor data from a recloser switchgear 12 to a recloser controller IED 20. As described below, the SIDs 80 in accordance with example embodiments each have an architecture that permits digitizing the sensor data and other signals (e.g., status signals) near the source (e.g., switchgear switch sensors) which significantly reduces the losses and noise introduced into the sensor data by conventional cables. These SIDs 80 also enable use of less expensive, and less complicated cabling between the switchgear 12 and the control cabinet 18.

Accordingly, when a SID 80 is deployed at a switchgear 12 on a utility pole 10 in accordance with example embodiments, significant advantages are realized by the SID 80 data connection to a switchgear controller 20, which does not introduce losses and otherwise decrease the integrity of the sensor data received from the switchgear switch sensors 28a-c, in contrast with the conventional multi-pin cable 26 described above in connection with FIGS. 3A and 3B. In addition, the SID 80 is connected to the switchgear controller 20 via a much simpler, less expensive and fewer pin count multi-pin cable 92 than the conventional 14-42 pin count multi-pin cable 26 described above in connection with FIGS. 3A and 3B, since the fewer pin count multi-pin cable 92 need only carry six wires, that is a pair of wires for transmitting, respectively, an open to close switch power signal and an close to open switch power signal for each of the switches 28a-c at the phase conductors. Thus, the fewer pin count multi-pin cable 92 is less complicated and less expensive than the conventional 14-42 pin count multi-pin cable 26 described above. As described below in connection with FIGS. 6B and 7B, example embodiments of the SID 80 eliminate the need for the fewer pin count multi-pin cable 92 between the SID 80 and control cabinet 18.

Figure 5:
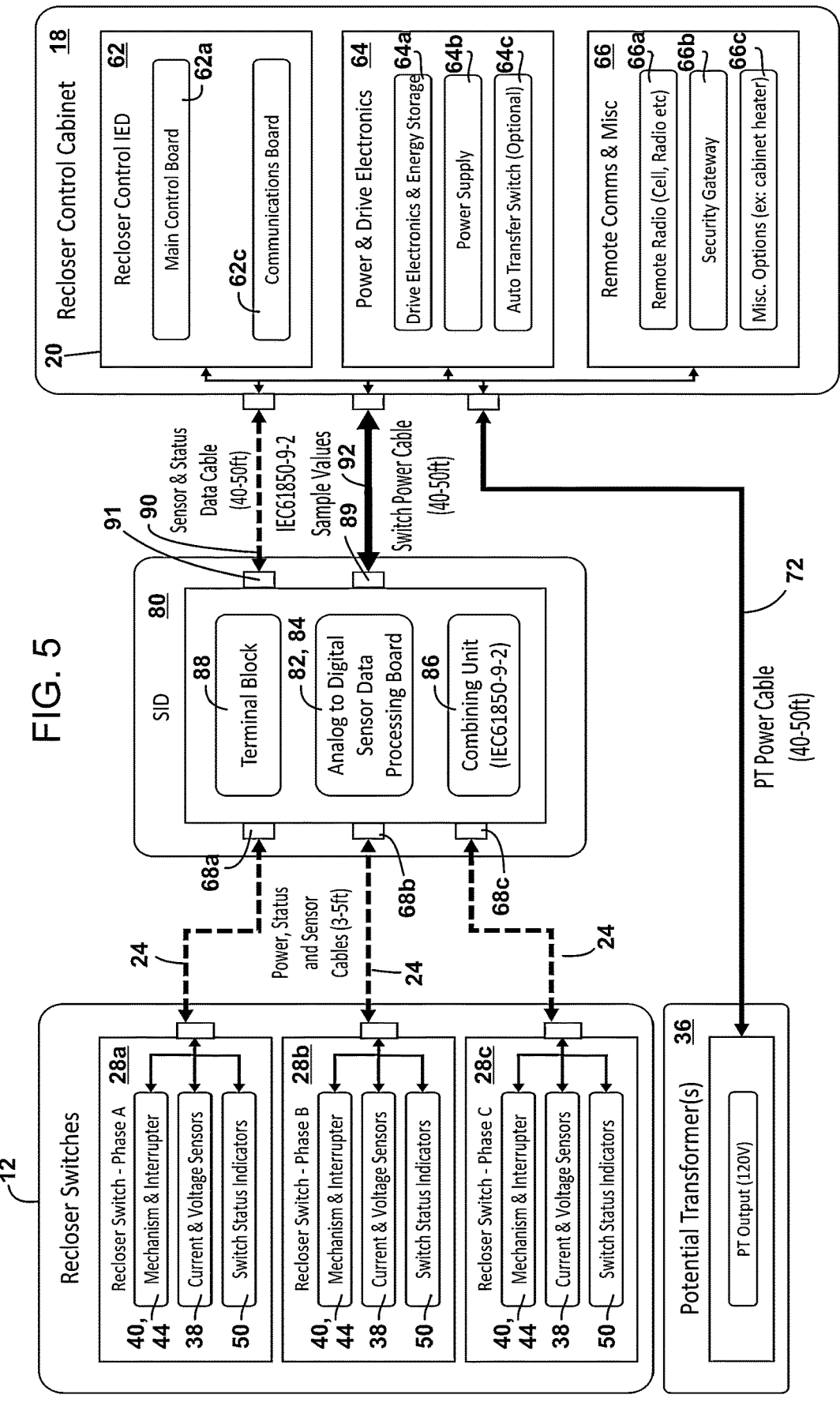
FIG. 5 is a block diagram of components of an improved switchgear interface device in accordance with an illustrative embodiment.

Reference is now made to FIG. 5, which is a block diagram of example components of a SID 80 configured in accordance with an illustrative embodiment. The SID 80 is connected between a switchgear 12 and a controller 20. FIG.

5 also depicts some components of the switchgear 12 (e.g., recloser switches 28a-c for three phase conductors and a potential transformer 36), and a recloser control cabinet 18. The recloser switches 28a-c each have, for example, an actuator mechanism 44 and interrupter 40, sensors 38 (e.g., current sensor 38a, voltage sensor(s) 38b,38c) and switch status indicators 50 as described above in connection with FIGS. 2A and 2B and 4. The example recloser control cabinet 18 has a recloser control IED 20,62, power and drive electronics 64 for generating the switch power signals that control the switchgear switches to open/trip or to close, and remote communications equipment 66. The IED 62 can comprise, for example, a main control board 62a and a communications board 62c, but no analog to digital sensor board 62b is needed in the IED 62. The power and drive electronics 64 can comprise, for example, drive electronics 64a and energy storage devices such as capacitors that power from a power supply 64b such as a battery provided in the cabinet. The battery provides power to other cabinet components and can be charged from a DC power signal obtained by a potential transformer on the switchgear. The power and drive electronics 64 can also comprise an optional automatic transfer switch 64c. The remote communications equipment 66 can comprise, for example, a wireless communication device 66a such as a cellular transceiver or radio transceiver. A security gateway 66b can be provided for when the IED transmits switchgear status and operational information to remote devices such as a utility power distribution management control station. Other miscellaneous components 66c can be provided in the controller cabinet 18 such as a cabinet heater. As will be described below in connection with FIGS. 6A and 7A, for example, the SID 80 can have different configurations with regard to how its components are connected to the switchgear switches 28a-c in accordance with example embodiments, but a SID generally comprises a terminal block 88 or other connection hardware to wires extending between the switchgear switches 28a-c and a junction box 16 or other housing mounted proximally to the switchgear on a distal end of a utility pole 10 in each embodiment. A SID 80 generally also comprises an analog to digital converter 82 for switchgear switch sensor data and switch status signals, a main processor and memory 84, and a data conversion and combining device 86 to format digital samples of sensor data signals and switch status signals and combine them in accordance with a designated format or protocol such as IEC61850-9-2). The terminal block 88 and/or the junction box 16 housing also comprises hardware connector(s) to provide signals from the data conversion and combining device 86 to a digital data cable 90 extending from the SID 80 to a controller 20 and/or control cabinet 18 installed at ground level on the proximal end of the utility pole 10.

Figure 6A:
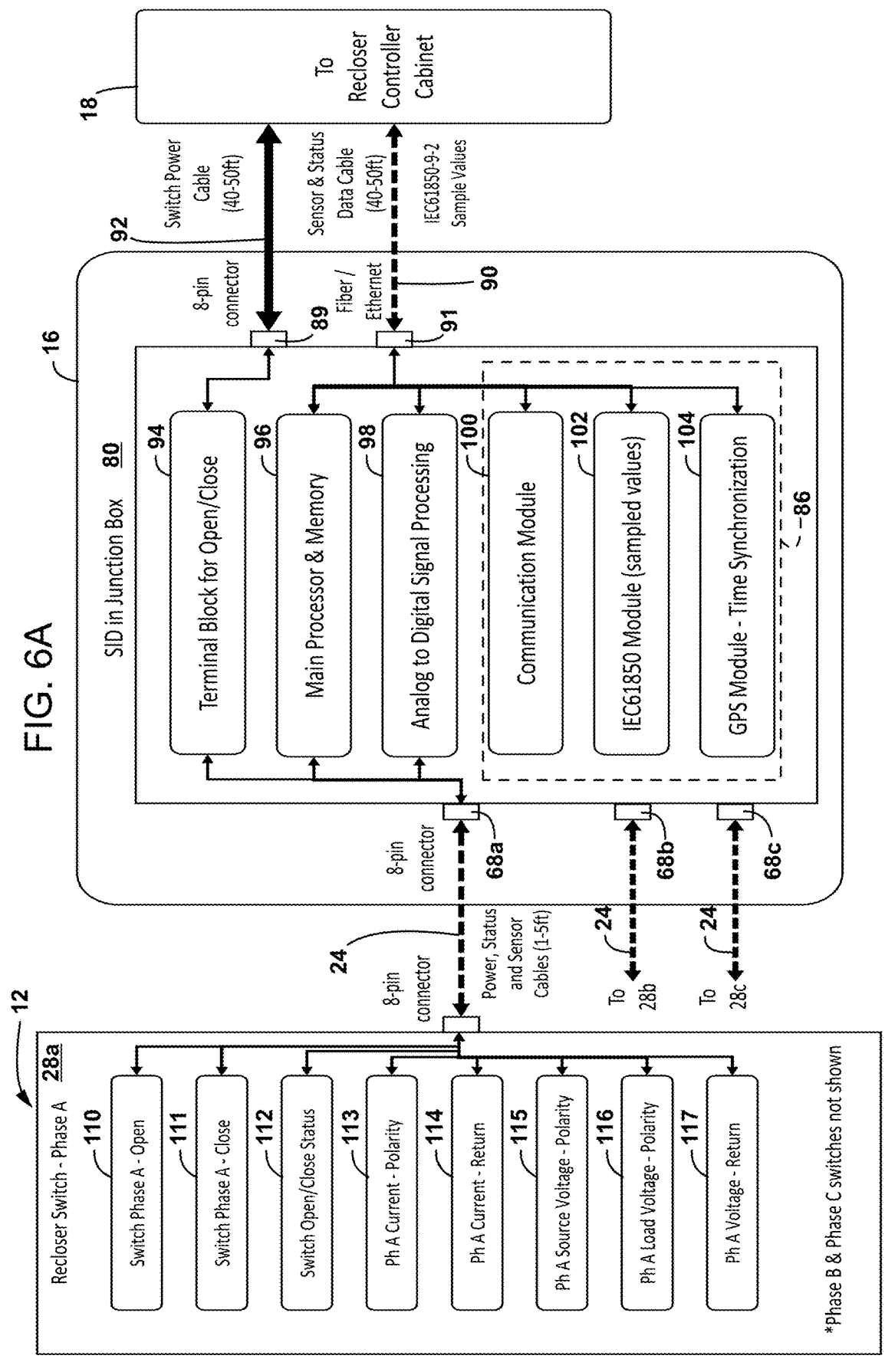
FIG. 6A is a block diagram of components of an improved switchgear interface device arranged in a junction box to deploy improved cabling to a control cabinet in accordance with an illustrative embodiment.

With reference to FIG. 6A, a SID 80 is implemented such that its components are in a junction box 16 mounted proximally to switchgear 12 at the distal end of a utility pole 10, and therefore a distance from the control cabinet 18 at an opposite end of the utility pole 10 that is near ground level and accessible by a technician. The SID 80 comprises a digital data connector 91 for connecting to a digital data cable 90 (e.g., a fiber or an Ethernet cable), and a terminal block 94 with a reduced pin count (e.g., 8 pins) multi-pin cable connector 89 for connecting to a reduced pin count (e.g., 8 pins) multi-pin cable 92 extending between the junction box 16 and the controller 20 and transporting switch power signals to open or close for each switch 28a-c. The SID 80 also comprises a switch side connector 68 (e.g., an 8 pin count multi-pin cable connector) to connect to a power, status and sensor cable 24 extending between the junction box 16 and the sensors and actuator of a switch 28 at a corresponding one of the phase conductors. For clarity, the switch for a Phase A conductor is shown, and the switches for Phase B and C conductors are not shown. It is to be understood that the SID also comprises switch side connectors 68*b-c* for cables connecting to the switches for the Phase B and C conductors. Example signals generated at or provided to various components in the switch 28 for the Phase A conductor and transported via a power, status and sensor cable 24 are also shown; that is, Switch—Open 110, Switch—Close 111, Switch Open/Close status 112, Current—Polarity 113, Current—Return 114, Source Voltage—Polarity 115, Load Voltage—Polarity, 116 and Voltage—Return 117. Similar signals are generated at or provided to various components in the switch for the Phase B and C conductors via respective power, status and sensor cables 24. The terminal block 80 is configured to provide switch power signals to each of the switches 28*a-c* in the Phase Conductors A, B and C to open from a closed position or to close from an open position.

With continued reference to FIG. 6A, the junction box 16 has an analog to digital converter (ADC) or signal processing device 98, a main processor and a memory 96, a communication module 100, a digital sampled values combining unit 102 (e.g., a IEC61850 module) and a time synchronization unit 104 (e.g., a GPS module). It is to be understood that the ADC 98, and the main processor and the memory indicated at 96 can each be a separate unit, or two or more of them can be an integrated unit. Further, the terms "module" and "unit" can each refer to an electrical circuit or to a software function. Different modules or units can have overlapping circuits or share common software. Although the various modules and units are shown in FIGS. 5, 6A, 6B, 7A and 7B as being physically distinct from one another, in fact they need not be. For example, without providing every conceivable example, the ADC 98 can be incorporated physically into the circuitry of the processor 96 (e.g., a microcontroller), and so can the memory. Formatting digitized signals in accordance with a designated standard (e.g., IEC 61850-9-2 standard) for communication to other devices can be performed by the same processor or by separate processing devices that perform one or more of the operations of the communication module 100, the digital sampled values combining unit 102 (e.g., a IEC61850 module) and the time synchronization unit 104 (e.g., a GPS module). The operations of the communication module 100, the digital sampled values combining unit 102 (e.g., a IEC61850 module) and the time synchronization unit 104 (e.g., a GPS module) are referred to collectively as a data conversion and combining device 86 for convenient reference herein.

In accordance with the example embodiments of FIGS. 5, 6A, 6B, 7A and 7B, the junction box 16 of the SID 80 operates as both a converging point for the electrical wires from recloser switches 28*a-c*, and as a combining unit that measures the current and voltage signals from each of the recloser switches' sensors 38*a-c*, digitizes, samples and formats sampled values of sensor data and status signal outputs for transmission together to the recloser controller or IED 20 in a standard-based digital output format such as IEC 61850-9-2. The processing in the SID 80 supports, for example, high-accuracy time synchronization per IEEE 1588 V2 standard. For example the sampled values are processed by the processor or a separate IEC 61850-9-2 unit to transmit high speed streams of data set samples encoded in multicast Ethernet frames. The processor 96 or a separate IEC 61850-9-2 unit 102 employs the IEC 61850-9-2 protocol with a publisher/subscriber model, in which a publisher transmits unacknowledged data to subscribers. In accordance with the architecture of the example embodiment, the SID 80 acts as the publisher and the recloser controller or IED 20 acts as the subscriber.

More specifically, one or more SID processors (i.e., which can be in the junction box 16 in accordance with an example embodiment, or in a recloser switch in accordance with another embodiment described below) converts analog sensor data values and switch status signal values to IEC61850-9-2LE sampled measured values. Thus, simplified cable assemblies 90, 92 can be used between the junction box 16 and a control cabinet 18 that only require a less complex cable 92 for switch power signals for opening and closing the switchgear switch(es) 28*a-c*, and a simple, inexpensive data cable 90 (e.g., fiber or Ethernet cable) for communication of sensor data (e.g., phase conductor current and voltage) and switch status to a recloser controller 20 without the degradation associated with the capacitive coupling from the higher voltage signals on the bundles of wire $54_{1-4}$ in a conventional cable 26 as described in connection with FIGS. 3A and 3B. Further, the recloser controller 20 in a control cabinet 18 need only have a IEC61850-9-2 Process Bus to receive sampled values for voltage and current from the junction box 16. There is no need to connect an expensive, heavy, 14-pin to 42-pin connector 52 from a conventional cable 26 to the cabinet 18, since the sensor and switch status data are received via a simple fiber or Ethernet connector 91 and corresponding digital data cable 90, and a simpler, less expensive 8-pin count multi-pin cable 92 can be used to provide, for example, open to close and close to open commands to each switch 29*a-c*. Further, as described with reference to FIGS. 6B and 7B, the SID 80 can be configured with drive electronics 106 and thereby eliminate the need for an 8-pin cable 92 to transport the switch power signals since they can original from the SID 80 instead.

The SID 80 can receive signals from switch sensors 38*a-c* such as any of high precision low power instrument transformers (LPITs) or optical sensor, a bushing CT, and/or voltage divider technology embedded in the recloser switches 28*a-c*. The LPITs provide a secondary signal proportional to the current and voltage primary values (e.g., according to IEC 61869-6, IEC 61869-10 and IEC 61869-11 standards) and can enhance medium voltage (MV) grid visibility by providing accuracy and reliability required by protection and meters devices (IEDs) to deploy advanced distribution automation functionalities, thereby enhancing operation efficiency and automation capabilities in a cost-effective manner. The current measurement in the recloser switch 28 can be based on Rogowski coils or optical sensors, and the voltage measurement in the recloser switch 28 can be based on resistive capacitive dividers or optical sensors. Nonetheless, even with highly accurate sensors, conventional controllers 20 do not receive the data from these sensors 38 with sufficient integrity due to losses incurred by the conventional 14-42 pin count multi-pin cables 26 that transmit their measured voltage and current values to the IED 20 as described in connection with FIGS. 3A and 3B. The SID 80, on the other hand, is advantageous because it collects, digitizes, samples, formats sensor and switch status data for transmission to the IED 20 via a data connection (e.g., fiber or Ethernet cable 90) that is separate from the open to close/close to open switch power signals that are provided to the SID 80 and then the switches 28*a-c* via a separate low pin count (e.g., 8-pin) multi-pin cable 92. Thus, the SID 80 eliminates the aspect of sending low voltage or low current analog signals over a long 40-50 foot conventional high count multi-pin cable 26 assembly and making the signals prone to noise and losses. In addition, the SID 80 eliminates the need for recloser controller or IED 20 to perform the digitization of the sensor data (A/D conversion), thus reducing the cost of the recloser controller or IED 20.

Figure 6B:
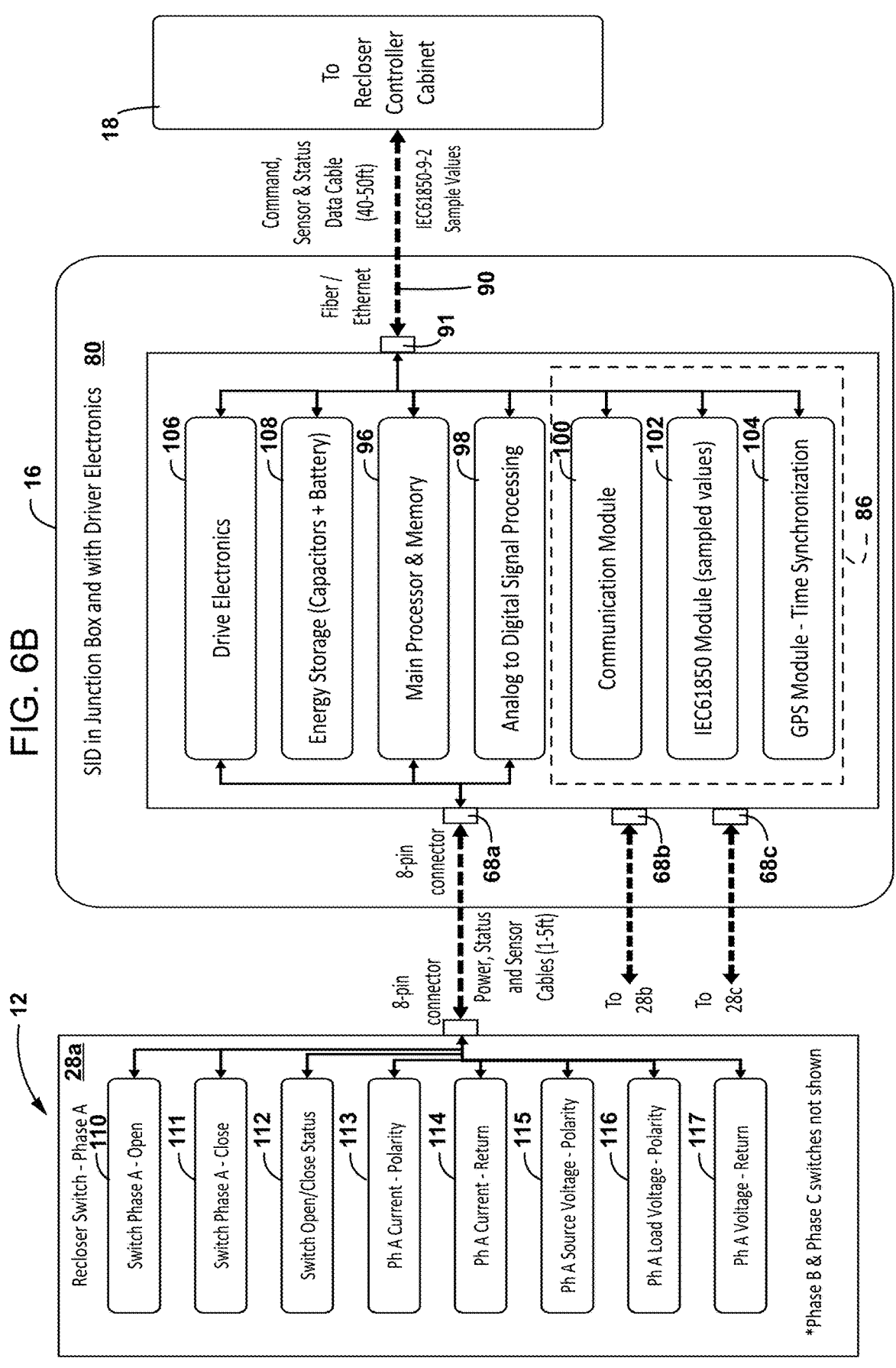
FIG. 6B is a block diagram of components of an improved switchgear interface device arranged in a junction box and having drive electronics to deploy improved cabling to a control cabinet in accordance with another illustrative embodiment.

With reference to FIG. 6B, the SID 80 comprises the following components at the junction box 16; that is, the analog to digital signal processing device 98, the main processor and memory 96, the communication module 100, the digital sampled values combining unit 102 (e.g., a IEC61850 module) and the time synchronization unit 104 (e.g., a GPS module). The SID 80 further comprises drive electronics 106 for generating switch power signals for each of the switches 28a-c in the Phase Conductors A, B and C to open from a closed position or to close from an open position, and energy storage devices 108 such as capacitors that power from a power supply such as a battery provided in the junction box. The power supply can receive power from the potential transformer 36, for example. A decision to open or close a switch 28 can be performed by the main processor 96, for example, based on received sensor data signals, which in turn operates the drive electronics 106. Alternatively, a decision to open or close a switch can be performed by the IED 20, which in turn sends switch control signals to the main processor 96 via the digital data cable 90. The example embodiment of the SID 80 shown in FIG. 6B therefore eliminates the need for a reduced pin count cable 92 (e.g., 8-pin count multi-pin cable) to transport switch power signals since they can originate from the SID 80 instead.

Figure 7A:
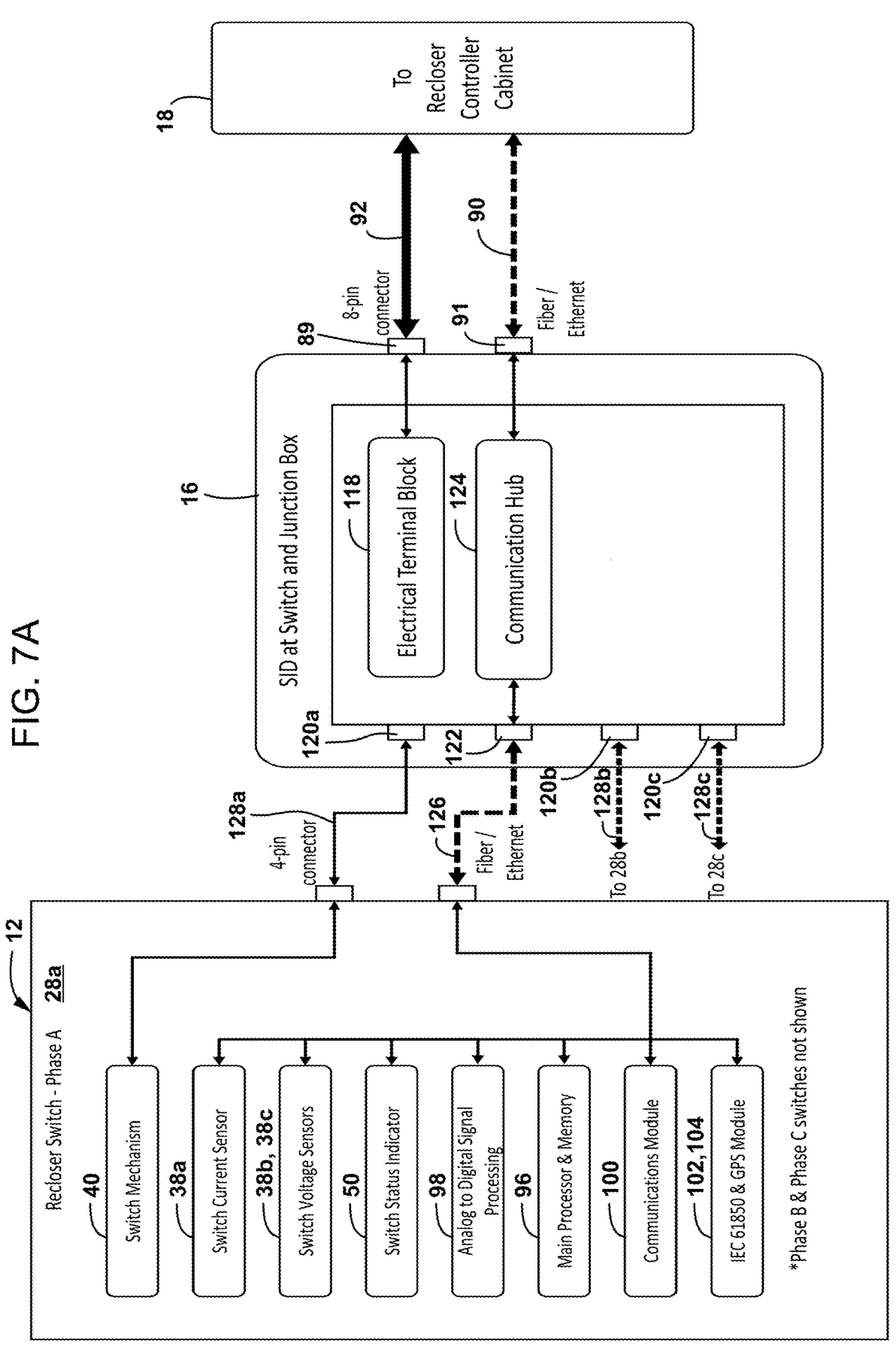
FIG. 7A is a block diagram of components of an improved switchgear interface device arranged at the switch(es) of the switchgear and in a junction box to deploy improved cabling to a control cabinet in accordance with yet another illustrative embodiment.

FIG. 7A depicts another example embodiment wherein a SID 80 comprises components at both the switches 28a-c and the junction box 16. For example, an analog to digital signal processing device 98, a main processor and memory 96, a communication module 100, a digital sampled values combining unit 102 (e.g., a IEC61850 module) and a time synchronization unit 104 (e.g., a GPS module) are provided at the switch 28a-c that are similar in operation to those provided at the junction box 16 in the embodiments shown in FIGS. 6A and 6B. An analog to digital signal processing device 98, a main processor and memory 96, a communication module 100, a digital sampled values combining unit 102 (e.g., a IEC61850 module) and a time synchronization unit 104 (e.g., a GPS module) can be provided at each switch 28a-c, or alternatively a common data conversion and combining device (not shown) can be implemented at the switchgear that comprises one or more of an analog to digital signal processing device 98, a main processor and memory 96, a communication module 100, a digital sampled values combining unit 102 (e.g., a IEC61850 module) and a time synchronization unit 104 (e.g., a GPS module) that are shared by the three switches 28a-c, while non-shared dedicated components are provided at each switch 28a-c. The SID 80 further comprises a terminal block 118 at the junction box 16 for providing switch power signals received from the control cabinet 18 to respective ones of the switches 28a-c via a 4-pin connector 120a-c and corresponding cable 128a-c. The SID 80 also comprises a communications hub 124 at the junction box 16 for transporting digital data signals received from each switch 28a-c, or alternatively from the common data conversion and combining device, to the digital data cable 90 connecting the junction box 16 to the control cabinet 18.

Figure 7B:
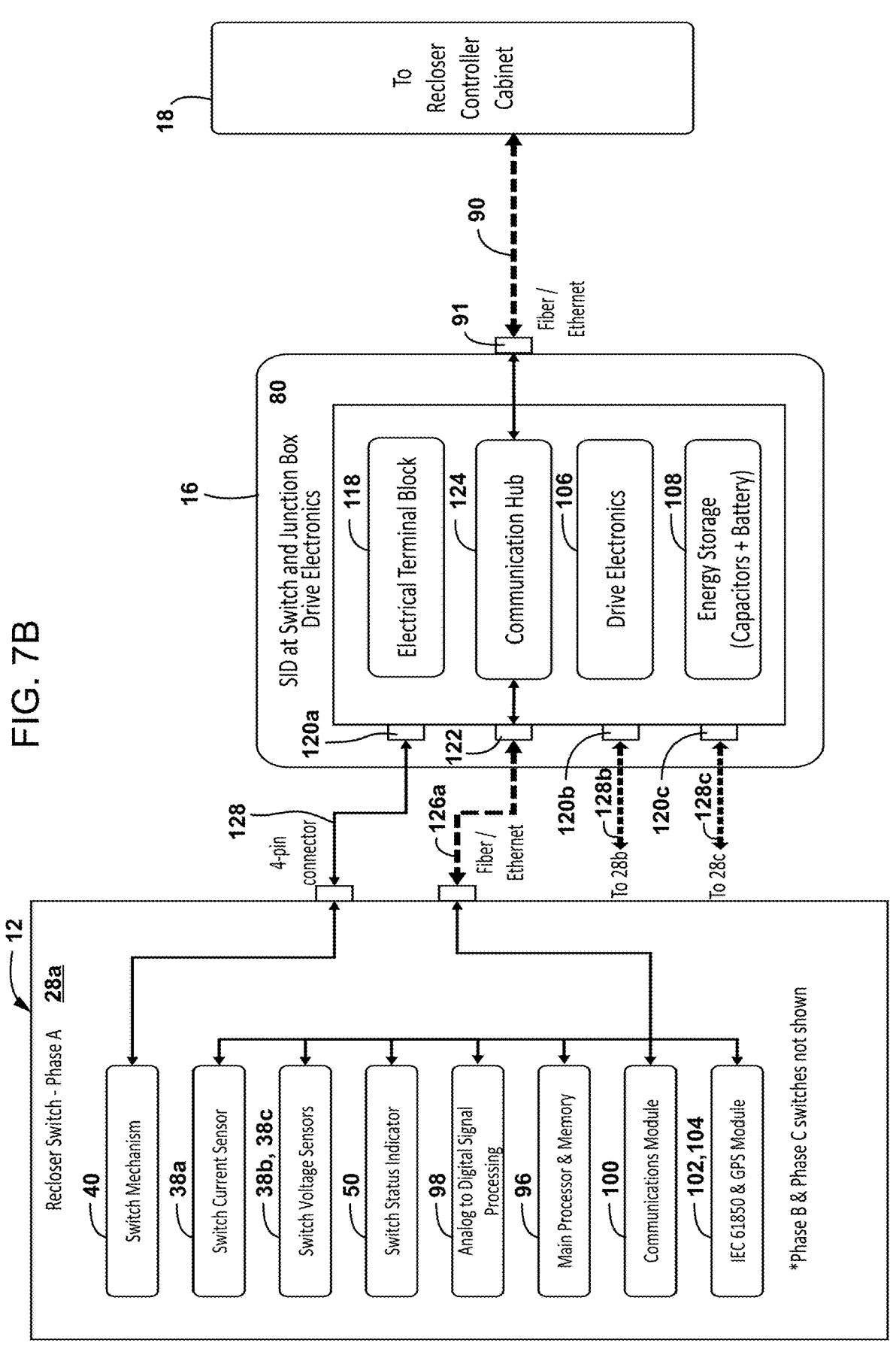
FIG. 7B is a block diagram of components of an improved switchgear interface device arranged at the switch(es) of the switchgear and in a junction box with drive electronics to deploy improved cabling to a control cabinet in accordance with still yet another illustrative embodiment.

With reference to the example embodiment shown in FIG. 7B, the SID 80 components at the junction box 16 can further comprise drive electronics 106 for generating switch power signals for each of the switches in the Phase Conductors A, B and C to open from a closed position or to close from an open position, and energy storage devices 108 such as capacitors that power from a power supply such as a battery provided in the junction box. The power supply can receive power from the potential transformer 36, for example. A decision to open or close a switch can be performed by the main processor 96, for example, based on received sensor data signals, which in turn sends control signals via the digital data cable 126 to operate the drive electronics 106. Alternatively, a decision to open or close a switch can be performed by the IED 20, which in turn sends switch control signals to the main processor 96 via the digital data cable 90. The example embodiment of the SID 80 shown in FIG. 7B therefore eliminates the need for a reduced pin count cable 92 (e.g., 8-pin count multi-pin cable) to transport switch power signals since they can originate from the SID 80 instead.

As described herein, an IED 20 is a microprocessor-based controller of power system equipment, such as circuit breakers, transformers, and capacitor banks. For example, an IED 20 receives data from sensors 38 and power equipment 28, and can issue control commands, such as tripping circuit breakers if the IED senses voltage, current, or frequency anomalies, or raise/lower voltage levels in order to maintain the desired level. Known types of IEDs include protective relaying devices, load tap changer controllers, circuit breaker controllers, capacitor bank switches, recloser controllers, voltage regulators, etc.

As described herein, the IEC61850 standard from International Electrotechnical Commission (IEC) is a standard for communication networks and systems, which advocates interoperability amongst Intelligent Electronic Devices (IEDs) from various manufacturers using common engineering models, data formats and communication protocol.

Example embodiments of a SID 80 and method of using same provide an innovative way to improve sensor performance and quality of the sensor data (better accuracy, precision, linearity, noise reduction, harmonic response, etc.) of overhead recloser switchgear. Advantages of example embodiments are simplified cabling, improved fidelity of sensor data for improved accuracy of sensor data readings, and improved accuracy of data and control functions based on the sensor data (i.e., more accurate switching at switchgear, more accurate grid control and monitoring (e.g., grid sector operational status and control). Even switchgear that employ more expensive sensors for greater accuracy still have data quality issues as explained above which are not resolved by the example embodiments. Improved fidelity of switchgear sensor data is characterized, for example, by sensor data at the sensor being accurately presented at a controller without significant corruption from noise or capacitive coupling associated with the signal line(s) between the sensor and the controller. Simplified cabling places less weight and strain on a junction box and control cabinet for easier field installation, as well as protection of the junction box or related switchgear housing and control cabinet from mechanical stress to increase housing lifetime or longevity in the field. Field installation of a control cabinet using a SID 80 in accordance with example embodiments and associated simplified cabling also simplifies calibration (e.g., fewer calibration factors needed).

More accurate delivery of the sensor data to a controller provides for better fault detection, for better sectionality of a grid in which the distribution line operates, and improved synchronizing phase applications, among other advantages. For example, improving sensing performance and overall quality of the sensor data from overhead recloser switchgear enables the utilities to use this data for critical and sensitive applications such as: a) improving power quality measurements at the recloser controller; b) improving current sensing accuracy, especially high current fault sensing accuracy; and c) increasing sectionalizing of circuits with large number of customers to enable utilities to install more reclosers in shorter spans and still coordinate them successfully. These advantages of a SID 80 help reduce the number of customers impacted by an permanent outage or momentary outages. In addition, a SID 80 can improves the performance of high impedance fault detection algorithms that are implemented in the recloser controllers. A SID 80 can improve the reliability of broken conductor detection or open neutral detection algorithms. The high quality sensor data provided using a SID 80 enables a utility to deploy distribution phasor measurement units (PMUs) and use the information effectively for distribution system modeling, fault location, predictive maintenance and situation awareness. Utilities can therefore leverage and maximize use of their existing distribution assets with one or more SIDs 80 in accordance with example embodiments of the present disclosure, rather than adding more devices, sensors, and the like, to achieve more desired features, communications, data storage, cybersecurity, and so on. SIDs 80 provide utilities with the ability to improve power quality issues with high DG/DER penetration (e.g., anti-islanding, Voltage Vector Shift, ROCOF), and to sectionalize and coordinate multiple reclosers due to improved CT fault sensor signal reporting accuracy, which is particularly helpful in urban areas with short feeders and high numbers of customers. The conventional cables and equipment described above in connection with FIGS. 1A through 4 provided sensor data with insufficient quality for critical applications such as downed conductor detection, high-impedance (Z) fault detection, distribution PMU, or precise fault location. The SID 80 of the example embodiments provides higher quality sensor data for successful use in these critical applications.

It will be understood by one skilled in the art that this disclosure is not limited in its application to the details of construction and the arrangement of components set forth in the above description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the illustrative embodiments can be easily construed as within the scope of claims exemplified by the illustrative embodiments by programmers skilled in the art to which the illustrative embodiments pertain. Method steps associated with the illustrative embodiments can be performed by one or more programmable processors executing a computer program, code or instructions to perform functions (e.g., by operating on input data and/or generating an output). Method steps can also be performed by, and apparatus of the illustrative embodiments can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of claims exemplified by the illustrative embodiments. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. In other words, the processor and the storage medium may reside in an integrated circuit or be implemented as discrete components.

Computer-readable non-transitory media includes all types of computer readable media, including magnetic storage media, optical storage media, flash media and solid state storage media. It should be understood that software can be installed in and sold with a central processing unit (CPU) device. Alternatively, the software can be obtained and loaded into the CPU device, including obtaining the software through physical medium or distribution system, including, for example, from a server owned by the software creator or from a server not owned but used by the software creator. The software can be stored on a server for distribution over the Internet, for example.

The above-presented description and figures are intended by way of example only and are not intended to limit the illustrative embodiments in any way except as set forth in the following claims. It is particularly noted that persons skilled in the art can readily combine the various technical aspects of the various elements of the various illustrative embodiments that have been described above in numerous other ways, all of which are considered to be within the scope of the claims.

The invention claimed is:

1. A method of communication between a medium voltage overheard switchgear and an intelligent electronic device (IED), the switchgear mounted on a distal end of a utility pole and connected to an electric power distribution line, the utility pole having a proximal end secured to a ground support and the IED secured at the proximal end, the switchgear having sensors at a switch provided at one of three phase conductors associated with the power distribution line, the method comprising:

receiving analog signals providing representations of current and voltage measured by the sensors at the switch, and at least one status signal indicating one of an opened status and closed status of the switch;

digitizing the analog signals to generate corresponding digital inputs therefrom;

sampling the digital inputs to obtain samples;

combining the samples into a set of merged digital samples having a designated format and comprising digital representations of the current or voltage of a corresponding one of the phase conductors measured by the sensors, the status signal, and metadata, the metadata chosen from identification of which of the sensors that the digital samples originated from, identification of the switch, at least one of identification and location data of the switchgear, performing the receiving, digitizing, sampling and combining via one or more components at a switchgear interface device located proximally to the switch and the distal end of the utility pole; and providing the merged digital samples and the metadata as outputs to a digital data connector located at the switchgear interface device and configured to be connected to a digital data cable.

2. The method of claim 1, further comprising connecting a digital data cable between the digital data connector and the IED, the digital data cable chosen from an optical fiber cable and an Ethernet cable, and the digital data connector chosen from a fiber cable connector and an Ethernet cable connector that corresponds to the digital data cable.

3. The method of claim 1, wherein combining the samples comprises formatting the merged digital samples using an IEC61850 standard from International Electrotechnical Commission (IEC).

4. The method of claim 3, wherein combining the samples comprises:

formatting the merged digital samples using an IEC61850-9-2 protocol chosen from the IEC61850 standard, the merged digital samples being encoded in multicast Ethernet frames; and transmitting the merged digital samples unacknowledged data from the switchgear interface device operating as a publisher in accordance with the IEC61850-9-2 protocol to subscribers comprising the IED.

5. The method of claim 3, wherein combining the samples further comprises providing global positioning system (GPS) time synchronization to the merged digital samples.

6. A switchgear interface device for a medium voltage overhead switchgear mounted on a distal end of a utility pole and connected to an electric power distribution line, the utility pole having a proximal end secured to a ground support and a cabinet with an intelligent electronic device (IED) secured at the proximal end, the switchgear having sensors at a switch provided at one of three phase conductors associated with the power distribution line, a switchgear interface device comprising:

a housing configured to be disposed adjacent the switchgear and mounted on the distal end of the utility pole;

a plurality of inputs at the housing configured to receive analog signals providing representations of current or voltage measured by the sensors at the switch, and to receive at least one status signal indicating one of an opened and closed status of the switch;

a processor disposed within the housing and configured to digitize the analog signals and the at least one status signal to generate corresponding digital inputs therefrom, sample the digital inputs to obtain samples, and combine the samples into a set of merged digital samples having a designated format and comprising digital representations of the current and voltage of a corresponding one of the phase conductors measured by the sensors, the status signal, and metadata, the metadata chosen from identification of which of the sensors that the digital samples originated from, identification of the switch, at least one of identification and location data of the switchgear;

a memory disposed within the housing and configured to store the set of merged digital samples; and a digital data connector connected to the housing and configured to be connected to a digital data cable chosen from an optical fiber cable and an Ethernet cable and to provide the merged digital samples and the metadata as outputs to the digital data cable and the IED when the digital data cable connects the digital data connector and the IED, the digital data connector chosen from a fiber cable connector and an Ethernet cable connector that corresponds to the digital data cable.

7. The switchgear interface device of claim 6, further comprising drive electronics and an energy storage device to power the drive electronics, the processor configured to receive at the digital data connector a switch command signal transmitted from the IED via the digital data cable and to operate the drive electronics to send a switch power signal to the switch to open or close in accordance with the switch command signal.

8. The switchgear interface device of claim 6, further comprising:

a switch power signals connector connected to the housing and configured to be connected to a second cable separate from the digital data cable and to receive switch power signals comprising a close to open signal and an open to close signal for the switch from the IED via the second cable when the second cable connects the switch power signals connector and the IED, the switch power signals connector comprising a plurality of connector inputs chosen from at least one of pins and receptacles and that each provide a corresponding one of the switch power signals to a terminal block in the housing that is electrically connected to a switch actuation mechanism in the switch.

9. The switchgear interface device of claim 6, wherein the designated format of the set of merged digital samples is an IEC61850 standard from International Electrotechnical Commission (IEC).

10. The switchgear interface device of claim 9, wherein the processor is configured to employ an IEC61850-9-2 protocol chosen from the IEC61850 standard wherein the processor operates as a publisher and transmits unacknowledged data to subscribers comprising the IED, the unacknowledged data comprising the merged digital samples encoded in multicast Ethernet frames.

11. The switchgear interface device of claim 9, wherein the processor is configured to employ global positioning system (GPS) time synchronization of the merged digital samples.

12. The switchgear interface device of claim 6, the switchgear having a second switch and a third switch provided respectively at the other two of the three phase conductors, wherein the plurality of inputs at the housing are configured to receive analog signals providing representations of current or voltage measured by sensors provided at each of the second switch and the third switch, and to receive status signals indicating one of an opened and closed status of the second switch and the third switch; and the processor is configured to digitize the analog signals and the status signals from the second switch and the third switch to generate corresponding digital inputs therefrom, sample the digital inputs and combine the samples into the set of merged digital samples having the designated format such that the set of merged digital samples generated by the processor further comprises digital representations of the current and voltage of the other two of the phase conductors measured by a corresponding one of the sensors, the status signals of each of the switches at the other two of the phase conductors, and the metadata corresponding to the second switch and the third switch and the sensors for the other two of the phase conductors.

13. A switchgear interface device for a medium voltage overhead switchgear mounted on a distal end of a utility pole and connected to an electric power distribution line, the utility pole having a proximal end secured to a ground support and a cabinet with an intelligent electronic device (IED) secured at the proximal end, the switchgear having sensors at a switch provided at one of three phase conductors associated with the power distribution line, the switchgear disposed adjacent to a junction box at the distal end of the utility pole, a switchgear interface device (SID) comprising:

switch SID components arranged proximally to and electrically connected to the switch, the switch SID components comprising a processor configured to receive analog signals from the sensors that are representations of current or voltage measured by the sensors at the switch, and at least one status signal indicating one of an opened status and a closed status of the switch, digitize the analog signals and the at least one status signal to generate corresponding digital outputs therefrom, sample the digital outputs to obtain samples, and combine the samples into a set of merged digital samples having a designated format and comprising digital representations of the current and voltage of a corresponding one of the phase conductors measured by the sensors, the status signal, and metadata, the metadata chosen from identification of which of the sensors that the digital samples originated from, identification of the switch, at least one of identification and location data of the switchgear;

a memory configured to store the set of merged digital samples; and a digital data connector configured to be connected to a digital data cable chosen from an optical fiber cable and an Ethernet cable and to provide the merged digital samples and the metadata to the junction box when the digital data cable connects the digital data connector and the junction box, the digital data connector chosen from a fiber cable connector and an Ethernet cable connector that corresponds to the digital data cable.

14. The switchgear interface device of claim 13, further comprising:

a second digital data connector mounted on the junction box and configured to be connected to the digital data cable and to receive the merged digital samples and the metadata from the switch SID components when the digital data cable connects the digital data connector and the second digital data connector on the junction box;

a third digital data connector connected to the junction box and configured to be connected to a second digital data cable chosen from an optical fiber cable and an Ethernet cable and to provide the merged digital samples and the metadata as outputs to the second digital data cable and the IED when the second digital data cable connects the third digital data connector and the IED, the third digital data connector chosen from a fiber cable connector and an Ethernet cable connector that corresponds to the second digital data cable; and a communications hub provided in the junction box and having a plurality of ports and configured to provide signals received at one of the ports to one or more of the other ones of the plurality of ports, the second digital data connector and the third digital data connector connected to a respective one of two of the plurality of ports, the communications hub being operable to provide the merged digital samples and the metadata received at the second digital data connector to the third digital data connector.

15. The switchgear interface device of claim 14, further comprising:

drive electronics in the junction box and an energy storage device in the junction box to power the drive electronics; and a multi-pin connector at each of the junction box and switch that interfaces with a switch power signals cable that is separate from the digital data cable, the multi-pin connector at the switch being electrically connected to an actuation mechanism for the switch, and the multi-pin connector at the junction box being electrically connected to the drive electronics;

wherein the processor is configured to receive at the digital data connector a switch command signal transmitted from the IED via the communications hub, the second digital data cable, and the digital data cable, and to send a control signal to the drive electronics via the digital data cable to operate the drive electronics to send a switch power signal to the switch to open or close in accordance with the switch command signal; and wherein the switch power signals cable transmits the switch power signal to the switch.

16. The switchgear interface device of claim 13, wherein the designated format of the set of merged digital samples is an IEC61850 standard from International Electrotechnical Commission (IEC).

17. The switchgear interface device of claim 16, wherein the processor is configured to employ an IEC61850-9-2 protocol from the IEC wherein the processor operates as a publisher and transmits unacknowledged data to subscribers comprising the IED, the unacknowledged data comprising the merged digital samples encoded in multicast Ethernet frames.

18. The switchgear interface device of claim 16, wherein the processor is configured to employ global positioning system (GPS) time synchronization of the merged digital samples.

19. The switchgear interface device of claim 13, wherein the switchgear comprises a second switch provided at the other two of the three phase conductors, and the switchgear interface device further comprises a second electronic circuit arranged proximally to the second switch, the second electronic circuit comprising:

a second processor configured to receive analog signals that are representations of current or voltage measured by sensors at the second switch, and at least one status signal indicating one of an opened status and a closed status of the second switch, to digitize the analog signals and the at least one status signal corresponding to the second switch to generate corresponding digital outputs therefrom, to sample the digital outputs of the second switch to obtain samples; and a second memory configured to store the samples of the second switch.

20. The switchgear interface device of claim 19, wherein the processor comprises a data conversion and combining device that is configured to combine the stored samples from the second switch into a second set of merged digital samples having the designated format and comprising digital representations of the current and voltage measured at the second switch, at least one status signal corresponding to the second switch, and second metadata chosen from identification of which of the sensors at the second switch that the digital samples originated from, identification of the second switch, and at least one of identification and location data of the switchgear; and combine the set of merged digital samples and the second set of merged digital samples and provide the combined samples to the junction box via the digital data connector.

* * * * *